United States Patent [19]

Arseneault et al.

[11] Patent Number: 4,969,774
[45] Date of Patent: Nov. 13, 1990

[54] USE OF PRE-COOKED AND PUFFED CEREALS AS OIL SPILL SORBENTS

[75] Inventors: Emile Arseneault, Montreal; Hervey Tremblay, St-Fulgence, both of Canada

[73] Assignee: Le Groupe Cegerco Inc., Montreal, Canada

[21] Appl. No.: 417,339

[22] Filed: Oct. 5, 1989

[51] Int. Cl.$^5$ .............................................. B01D 15/00
[52] U.S. Cl. ...................................... 405/60; 210/691; 210/924
[58] Field of Search ..................... 405/60, 63; 210/691, 210/924

[56] References Cited

U.S. PATENT DOCUMENTS

| | | | |
|---|---|---|---|
| 3,902,998 | 9/1975 | Bertram | 210/691 |
| 4,066,539 | 1/1978 | Hachisu et al. | 210/680 |
| 4,240,800 | 12/1980 | Fischer | 134/7 |
| 4,412,925 | 11/1983 | Ballerini et al. | 166/246 X |
| 4,415,661 | 11/1983 | Thirumalachar et al. | 435/174 |

*Primary Examiner*—Randolph A. Reese
*Assistant Examiner*—John Ricci
*Attorney, Agent, or Firm*—Swabey Ogilvy Renault

[57] ABSTRACT

Oil is removed from the surface of water by contacting the oil with a non-toxic, biodegradable oil-absorbing material selected from the group consisting of pre-cooked and puffed cereals, in an amount sufficient to cause agglomeration of the oil-loaded material and formation of a buoyant semi-solid mass, and removing the buoyant semi-solid mass from the surface of the water. The method according to the invention is particularly useful for collecting and removing oil accidently discharged into open waters by oil tanker ships and enables substantially total recovery of the oil spills.

20 Claims, No Drawings

USE OF PRE-COOKED AND PUFFED CEREALS AS OIL SPILL SORBENTS

The present invention relates to the removal of oil spills from the surface of water. More particularly, the invention is concerned with the use of non-toxic, biodegradable oil-absorbing materials for removing oil spills.

Spills of petroleum base oil in open waters have become of increasing concern due to the ecological and environmental damages that are caused. It is well known that oil film contamination can cause serious damage to aquatic life as oil films retard penetration of oxygen into water. Oil washed on beaches also destroys foreshore marine life. If the oil is not collected and removed within a certain period of time after the occurrence of the spill, evaporation of volatiles contained in the oil will cause an enhancement in concentration of the non-volatiles and thus an increase in oil density and viscosity, resulting in sinking of the oil. If the oil is conveyed to the bottom, it will associate irreversibly with sediment including sediments which support populations which are of economic or ecological significance.

Numerous schemes have been proposed for collecting, dispersing or neutralizing oil spills, but to date, none has proven to be entirely satisfactory. For instance, oil-absorbing materials made of natural fibers such as grass peat fibers have been used for collecting and removing oil accidently discharged into the sea by oil tanker ships. Since these oil-absorbing materials are hydrophilic, they absorb not only oil but also water when put into a water area contaminated by oil and thus will sink if in contact with water for a long period of time without being collected.

Synthetic oil-absorbing materials made of foam, fabric mats or pads have also been proposed, but these are generally non-biodegradable and thus may cause ecological and environmental damages if uncollected.

It is therefore an object of the present invention to overcome the above drawbacks and to provide a method of removing oil from the surface water using a non-toxic, biodegradable oil-absorbing material which retains the ability to hold oil in water for long periods of time to provide a product which can be readily collected and/or disposed of.

In accordance with the invention, there is thus provided a method of removing oil from water surface, which comprises contacting the oil with a non-toxic, biodegradable oil-absorbing material selected from the group consisting of pre-cooked and puffed cereals, in an amount sufficient to cause agllomeration of the oil-loaded material and formation of a buoyant semi-solid mass, and removing the buoyant semi-solid mass from the surface of the water.

The present invention also provides, in another aspect thereof, a method of removing oil from oil spills, which comprises contacting the oil with a non-toxic, biodegradable oil-absorbing material selected from the group consisting of pre-cooked and puffed cereals, in an amount sufficient to form a semi-solid mass, followed by the removal of such semi-solid mass.

Applicant has found quite unexpectedly that pre-cooked and puffed cereals can be used as oil spill sorbents for efficiently removing oil from the surface of water. Moreover, Applicant has observed that upon contacting the oil with granules of pre-cooked or puffed cereal and allowing the granules to absorb the oil, the oil-loaded granules of cereal gather into a mass on the surface of the water, thereby forming a buoyant semi-solid product which can be readily collected. Such a product can thereafter be compressed to recover the oil and shaped into briquettes or any other convenient form for use as fuel.

Examples of suitable puffed cereals which can be used in accordance with the invention include puffed millet, puffed rice, puffed corn and puffed wheat. As example of pre-cooked cereals, pre-cooked rice is particularly preferred.

Where use is made of puffed cereals as oil spill sorbents, these can be advantageously produced from cereal kernels on board a vessel by subjecting the kernels to a suitable heat treatment, and thereafter be discharged from the vessel onto the oil to be removed.

The method according to the invention is particularly useful for removing oil accidently discharged in open waters by oil tanker ships and enables substantially total recovery of the oil spills The following non-limiting examples further illustrate the invention.

EXAMPLE 1

Pre-cooked rice was tested for its ability to pick up crude oil from sea water.

50 ml of crude oil having an API of 20.8 were poured into 450 ml of sea water and a predetermined amount of pre-cooked rice was contacted with the oil. After standing for 20 minutes, the oil-loaded sorbent sample which formed a buoyant semi-solid mass was removed, allowed to drain for several minutes and then weighed. An oil/water mixture was thereafter pressed out of the sample and the sample was reweighed.

100% of the crude oil was removed by the pre-cooked rice and the sea water was left uncontaminated. The maximum oil absorption capacity, water pickup, oil pickup ratio and bulk density of the pre-cooked rice tested are reported in Table 1 hereinbelow.

EXAMPLE 2

The procedure described in Example 1 was repeated, except that the sorbent tested was puffed millet instead of pre-cooked rice.

99.9% of the crude oil was removed by the puffed millet. The maximum oil absorption capacity, water pickup, oil pickup ratio and bulk density of the puffed millet tested are reported in Table 1.

EXAMPLE 3

The procedure described in Example 1 was repeated, except that the sorbent tested was puffed rice instead of pre-cooked rice.

96.24% of the crude oil was removed by the puffed rice. The maximum oil absorption capacity, water pickup, oil pickup ratio and bulk density of the puffed rice tested are reported in Table 1.

EXAMPLE 4

The procedure described in Example 1 was repeated, except that the sorbent tested was puffed corn instead of pre-cooked rice.

95.35% of the crude oil was removed by the puffed corn. The maximum oil absorption capacity, water pickup, oil pickup ratio and bulk density of the puffed corn tested are reported in Table 1.

EXAMPLE 5

The procedure described in Example 1 was repeated, except that the sorbent tested was puffed wheat instead of pre-cooked rice.

96 60% of the crude oil was removed by the puffed wheat. The maximum oil absorption capacity, water pickup, oil pickup ratio and bulk density of the puffed wheat tested are reported in Table 1.

TABLE 1

| Sorbent | Maximum Oil Absorption Capacity (g/g) | Maximum Water Pickup (g/g) | Oil Pickup Ratio (Sorbent:Oil) | Bulk Density (kg/m$^3$) |
| --- | --- | --- | --- | --- |
| Pre-cooked Rice | 4.99 | 0.44 | 1:5 | 456.53 |
| Puffed Millet | 4.82 | 0.13 | 1:4 | 65.45 |
| Puffed Rice | 4.37 | 0.13 | 1:4 | 63.58 |
| Puffed Corn | 3.59 | 0.10 | 1:3.5 | 79.17 |
| Puffed Wheat | 4.09 | 0.15 | 1:4 | 65.76 |

We claim:

1. A method of removing oil from water surface, which comprises contacting the oil with a non-toxic, biodegradable oil-absorbing material selected from the group consisting of pre-cooked cereal kernels and puffed cereals, in an amount sufficient to cause agglomeration of the oil-loaded material and formation of a buoyant semi-solid mass, and removing said buoyant semi-solid mass from the surface of the water.

2. A method as claimed in claim 1, wherein said oil-absorbing material comprises pre-cooked cereal kernels.

3. A method as claimed in claim 2, wherein said pre-cooked cereal kernels are pre-cooked rice kernels.

4. A method as claimed in claim 3, wherein said pre-cooked rice kernels are used in an amount such that the ratio of pre-cooked rice kernels to oil by weight is about 1:5.

5. A method as claimed in claim 1, wherein said oil-absorbing material comprises a puffed cereal.

6. A method as claimed in claim 5, wherein said puffed cereal is puffed millet.

7. A method as claimed in claim 6, wherein said puffed millet is used in an amount such that the ratio of puffed millet to oil by weight is about 1:4.

8. A method as claimed in claim 5, wherein said puffed cereal is puffed rice.

9. A method as claimed in claim 8, wherein said puffed rice is used in an amount such that the ratio of puffed rice to oil by weight is about 1:4.

10. A method as claimed in claim 5, wherein said puffed cereal is puffed corn.

11. A method as claimed in claim 10, wherein said puffed corn is used in an amount such that the ratio of puffed corn to oil by weight is about 1:3.5.

12. A method as claimed in claim 5, wherein said puffed cereal is puffed wheat.

13. A method as claimed in claim 12, wherein said puffed wheat is used in an amount such that the ratio of puffed wheat to oil by weight is about 1:4.

14. A method as claimed in claim 5, wherein said puffed cereal is produced from cereal kernels on board a vessel and discharged from said vessel onto the oil to be removed.

15. A method of removing oil from oil spills, which comprises contacting the oil with a non-toxic, biodegradable oil-absorbing materials selected from the group consisting of pre-cooked cereal kernels and puffed cereals, in an amount sufficient to form a semi-solid mass, followed by the removal of said semi-solid mass.

16. A method as claimed in claim 15, wherein said oil-absorbing material comprises pre-cooked cereal kernels.

17. A method as claimed in claim 16, wherein said pre-cooked cereal kernels are pre-cooked rice kernels.

18. A method as claimed in claim 15, wherein said oil-absorbing material comprises a puffed cereal selected from the group consisting of puffed millet, puffed rice, puffed corn and puffed wheat.

19. A method as claimed in claim 18, wherein said puffed cereal is puffed millet.

20. A method as claimed in claim 18, wherein said puffed cereal is puffed rice.

* * * * *